United States Patent Office 3,356,676
Patented Dec. 5, 1967

3,356,676
PROCESS AND INTERMEDIATES FOR THE MANUFACTURE OF 19 - HYDROXY CHOLESTANES
Leonard N. Nysted, Highland Park, and Raphael Pappo, Skokie, Ill., assignors to G. D. Searle & Co., Chicago, Ill., a corporation of Delaware
No Drawing. Filed May 19, 1965, Ser. No. 457,217
Claims priority, application Great Britain, June 18, 1964, 25,292/64
9 Claims. (Cl. 260—239.55)

ABSTRACT OF THE DISCLOSURE

Novel process and novel intermediates for the manufacture of 19-hydroxy steroids useful for the production of pharmacological agents, e.g. estrone. The process involves the steps of oxidizing, suitably with lead tetraacetate, a 5α-acetoxy-6β-hydroxy intermediate derived from a naturally occurring sterol such as cholesterol, β-sitosterol or stigmasterol, selectively hydrolyzing the 3-ester function of the resulting 5α-acetoxy-6β,19-epoxide, oxidizing, for example with chromic acid, the 3-hydroxy function and reducing, by means of zinc and a Lewis acid, the 6β,19-epoxy moiety to afford the 19-hydroxy 3-keto-Δ$^4$ structure.

---

This invention is concerned with a novel process which utilizes novel intermediates for the manufacture of 19-hydroxy sterol derivatives, particularly those represented by the following structural formula

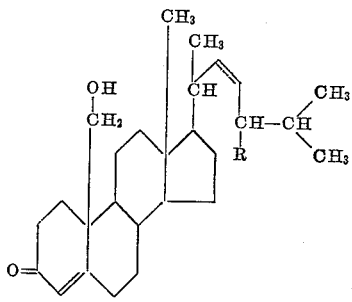

wherein R can be either a hydrogen or an ethyl radical, and the dotted line is symbolic of an optional 22,23 double bond. The novel intermediates of particular interest encompassed by the present invention are structurally illustrated by the following formula

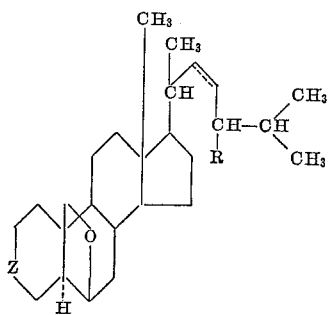

wherein R and the dotted line are as hereinbefore defined, and Z is a carbonyl, β-hydroxymethylene or β-(lower alkanoyl)oxymethylene radical. The lower alkanoyl radicals depicted in that structural representation are specifically illustrated by formyl, acetyl, propionyl, butyryl, valeryl, caproyl, heptnoyl, and the branched-chain radicals isomeric therewith.

The instant process utilizes as starting materials naturally occurring sterols. Preferred starting materials are the 3-(lower alkanoyl) esters included within the scope of the following structural formula

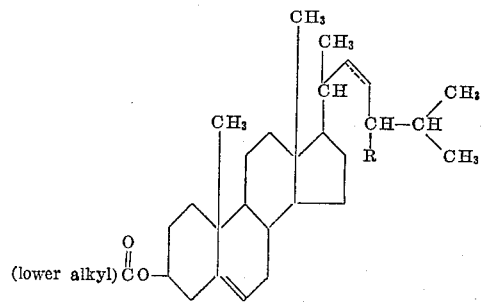

wherein R and the dotted line have the identical meanings as stated hereinbefore. Specific examples of these naturally occurring substances are β-sitosterol, cholesterol and stigmasterol. Especially preferred starting materials are β-sitosterol and cholesterol.

The novel process of this invention involves as the first step epoxidation of the starting material, typically with an organic peracid such as peracetic acid to afford the corresponding 5,6-epoxy derivative. Under those conditions the aforementioned 24β-ethylcholest-5-en-3β-ol 3-acetate, for example, is contacted with a peracetic acid-acetic acid solution at or near room temperature to produce 5,6-epoxy-24β-ethylcholestan-3β-ol 3-acetate. Cleavage of the epoxy group is effected by reaction with an inorganic acid such as perchloric acid, thus producing 24β-ethylcholestane-3β,5α,6β-triol 3-acetate. Acylation of the latter substance with a lower alkanoic acid anhydride or halide, typically acetic anhydride, preferably in the presence of a suitable catalyst such as p-toluenesulfonic acid, affords the corresponding 3,5,6-triacetate. Selective hydrolysis of that triacetate, typically by heating with potassium bicarbonate in methanol results in 24β-ethylcholestane-3β,5α,6β-triol 5-acetate. Selective esterification of that substance, suitably by reaction with acetyl chloride in pyridine, results in reaction of the 3-hydroxy group to afford 24β-ethylcholestane-3β,5α,6β-triol 3,5-diacetate. When that diester is oxidized with a suitable reagent such as lead tetraacetate, preferably in the presence of iodine, 6β,19-epoxy-24β-ethylcholestane-3β,5α-diol 3,5-diacetate is obtained. Hydrolysis of the 3-ester function by heating with potassium bicarbonate in methanol affords 6β,19-epoxy-24β-ethylcholestane-3β,5α-diol 5-acetate. When that 3-hydroxy group is oxidized, for example with aqueous chromic acid in acetone, the instant 5α-acetoxy-6β,19-epoxy-24β-ethylcholestan-3-one is produced. Deacetoxylation and reduction of the epoxy function are accomplished simultaneously by reaction with zinc and a Lewis acid in a suitable organic solvent medium. Specific examples of Lewis acids are aluminum chloride, ferric chloride, stannic chloride, boron trifluoride and zinc chloride. Thus, the aforementioned 5a - acetoxy - 6β,19 - epoxy-24β-ethylcholestan-3-one is contacted with zinc and zinc chloride in ethanol to produce the desired 24β-ethyl-19-hydroxycholest-4-en-3-one.

The 19-hydroxy steroids produced by the novel process of the present invention are useful as intermediates in the manufacture of pharmacologically useful steroids. For example, 19-hydroxycholest-4-en-3-one and 24β-ethyl-19-hydroxycholest-4-en-3-one, as is described by Sih and Wang, J. Am. Chem. Soc., 87, 1387 (1965), are converted to estrone by microbiological aromatization and simultaneous degradation of the side chain.

The invention will appear more fully from the examples which follow. These examples are set forth by way of illustration only, and it will be understood that the invention is not to be construed as limited either in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a rapidly stirred solution of 91.3 parts of 24β-ethylcholest-5-en-3β-ol 3-acetate in 401 parts of benzene, cooled to 0–5°, is added in three portions over a period of about 15 minutes a mixture of 10 parts of potassium acetate and 60 parts by volume of 40% peracetic acid in acetic acid. The mixture is then allowed to warm to room temperature over a period of about one hour, after which time it is stirred for about 16 hours longer. Dilution of the reaction mixture with an equal volume of hexane affords an organic solution which is washed successively with 20% aqueous potassium bicarbonate and 10% aqueous sodium bisulfite. The washed solution is then dried over anhydrous sodium sulfate and concentrated to dryness under reduced pressure. Recrystallization of the residue solid from acetone produces 5,6-epoxy-24β-ethylcholestan-3β-ol 3-acetate, melting at about 147–149°.

*Example 2*

A solution of 93.7 parts of 5,6-epoxy-24β-ethylcholestan-3β-ol 3-acetate in 712 parts of acetone is warmed with stirring to about 30°, after which time a solution of 14.4 parts of 60% aqueous perchloric acid in 47 parts of water is added dropwise over a period of about 20 minutes. The mixture is then stirred at room temperature for about 2 hours and concentrated to approximately one-fourth volume by distillation under reduced pressure. Approximately 1000 parts of water is then added, and the remaining acetone is removed by furthur distillation under reduced pressure. The resulting aqueous suspension is extracted with chloroform, and the chloroform layer is separated, washed with 20% aqueous potassium bicarbonate, dried over anhydrous sodium sulfate and concentrated under reduced pressure to afford a solid residue. Recrystallization of that crude product from chloroform-pentane produces pure 24β-ethylcholestane-3β,5α,6β-triol 3-acetate, melting at about 233–236°.

*Example 3*

To a rapidly stirred suspension of 89 parts of 24β-ethylcholestane-3β,5α,6β-triol 3-acetate in a mixture of 141 parts of acetic acid and 145 parts of acetic anhydride, maintained at room temperature by means of cooling with a water bath, is added a solution of 2.7 parts of p-toluenesulfonic acid monohydrate in 10.8 parts of acetic anhydride. The reaction mixture is stirred at room temperature for about 8 hours, then is diluted with approximately 1500 parts of water in order to decompose the excess reagent. During that dilution procedure the temperature is kept near room temperature by means of a cooling bath. The resulting mixture is extracted with hexane, and the organic layer is separated, washed with 20% aqueous potassium bicarbonate, dried over anhydrous sodium sulfate and concentrated under reduced pressure to afford the crude solid product. That material is recrystallized from aqueous isopropyl alcohol to afford 24β-ethylcholestane-3β,5α,6β-triol 3,5,6-triacetate, melting at about 140–142°.

*Example 4*

To a refluxing suspension of 97.5 parts of 24β-ethylcholestane-3β,5α,6β-triol 3,5,6-triacetate in 780 parts of methanol is added, with stirring, 145 parts of solid potassium bicarbonate. Heating at the reflux temperature is continued for about 8 hours, after which time approximately 100 parts of acetic acid is added dropwise over a period of about 20 minutes. The organic solvents are removed by distillation under reduced pressure, and the resulting residue is slurried with approximately 300 parts of water. Extraction of that mixture with chloroform affords an organic solution which is washed with 20% aqueous potassium bicarbonate, dried over anhydrous sodium sulfate and distilled to dryness under reduced pressure. The solid residue is triturated with pentane, then filtered and dried to afford pure 24β-ethylcholestane-3β,5α,6β-triol 5-acetate.

*Example 5*

A solution of 70.2 parts of 24β-ethylcholestane-3β,5α,6β-triol 5-acetate in 343 parts of pyridine is cooled to about −10°, after which time 20 parts of acetyl chloride is added dropwise over a period of about 10 minutes. The reaction mixture is allowed to warm to room temperature over a period of about 90 minutes, following which period of time stirring is continued for approximately 3 hours. Dilution with about 1000 parts of water effects crystallization of the crude product. The resulting slurry is cooled to about 0°, then is filtered and the filter cake is washed thoroughly with water, then dried under reduced pressure to afford the crude substance. Recrystallization from hexane-pentane results in 24β-ethylcholestane-3β,5α,6β-triol 3,5-diacetate, melting at about 179–181°.

*Example 6*

A solution of 71 parts of 24β-ethylcholestane-3β,5α,6β-triol 3,5-diacetate and 18.5 parts of iodine in 3040 parts of carbon tetrachloride is stirred and heated at the reflux temperature while 97 parts of lead tetraacetate is added portionwise over a period of about 5 minutes. The resulting reaction mixture is heated at the reflux temperature for about 2½ hours, then cooled to about 30°, after which time 125 parts of zinc dust is added. The reaction mixture is stirred at approximately 30° for about 2 hours, then is filtered. The filtrate is washed with 20% aqueous sodium thiosulfate, then is dried over anhydrous sodium sulfate and concentrated to an oil by distillation under reduced pressure. That oil is crystallized from methanol to afford pure 6β,19-epoxy-24β-ethylcholestane-3β,5α-diol 3,5-diacetate, melting at about 140–142°. This compound can be represented by the following structural formula

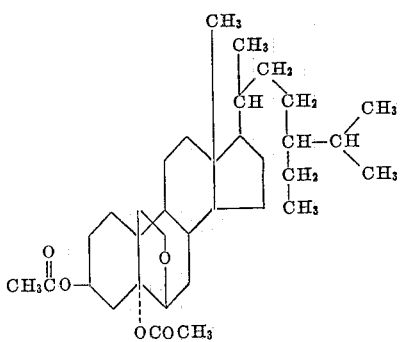

*Example 7*

A suspension of 52 parts of 6β,19-epoxy-24β-ethylcholestane-3β,5α-diol, 3,5-diacetate and 78 parts of potassium bicarbonate in 416 parts of methanol is heated at the reflux temperature for about 20 minutes, after which time approximately 50 parts of acetic acid is added dropwise over a 15-minute period. The methanol is removed by distillation under reduced pressure, and the resulting residue is diluted with approximately 500 parts of water. The resulting precipitated solid is collected by filtration, washed on the filter with water and dried to produce 6β,19-epoxy-24β-ethylcholestane-3β,5α-diol 5-acetate, characterized by infrared absorption maxima, in a potassium bromide disc, at about 2.88 and 5.82 microns. It can be represented also by the following structural formula

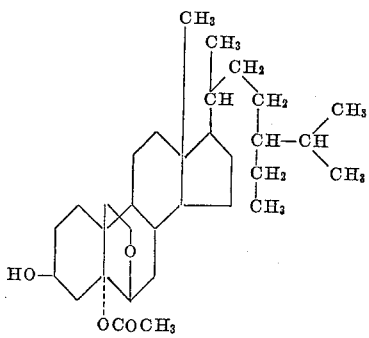

Example 8

To a solution of 45 parts of 6β,19-epoxy-24β-ethylcholestane-3β,5α-diol 5-acetate in 533 parts of acetone, cooled to about 5°, is added dropwise over a period of about 10 minutes, 25 parts by volume of an aqueous solution, 8 N in chromium trioxide and 8 N in sulfuric acid. The resulting reaction mixture is stirred for about 15 minutes, then is diluted with approximately 24 parts of isopropyl alcohol. Stirring is continued for about 15 minutes longer, after which time the solids are removed by filtration. The filtrate is then concentrated to dryness by distillation under reduced pressure and the resulting solid is then slurried with approximately 300 parts of water. Filtration of that solid material, followed by recrystallization from aqueous methanol results in 5α-acetoxy-6β,19-epoxy-24β-ethylcholestan-3-one, melting at about 115–125°. This compound is represented by the following structural formula

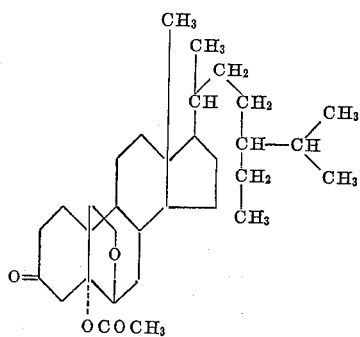

Example 9

To a refluxing solution of 30 parts of 5α-acetoxy-6β,19-epoxy-24β-ethylcholestan-3-one in 336 parts of ethanol together with approximately 300 parts of suspended activated zinc is added dropwise, over a period of about 15 minutes with stirring, a solution of 45 parts of zinc chloride in 216 parts of ethanol. The reaction mixture is heated at the reflux temperature with stirring for about 6 hours, then is cooled and filtered. The ethanol filtrate is concentrated to an oil by distillation under reduced pressure, and that oil is purified by dissolution in ether, followed by successive washings with 10% aqueous hydrochloric acid, water and 10% aqueous potassium bicarbonate. The washed solution is then dried over anhydrous sodium sulfate and stripped of solvent by distillation under reduced pressure. The residual solid is recrystallized from methylene chloride–hexane to afford 24β-ethyl-19-hydroxycholest-4-en-3-one, melting at about 171–172°.

Example 10

The peroxidation of an equivalent quantity of cholest-5-en-3β-ol 3-acetate according to the procedure described in Example 1 results in 5,6-epoxycholestan-3β-ol 3-acetate.

Example 11

By substituting an equivalent quantity of 5,6-epoxycholestan-3β-ol 3-acetate and otherwise proceeding according to the procedure described in Example 2, there is obtained cholestane-3β,5α,6β-triol 3-acetate.

Example 12

By substituting an equivalent quantity of cholestane-3β,5α,6β-triol 3-acetate and otherwise proceeding according to the processes described in Example 3, there is obtained cholestane-3β,5α,6β-triol 3,5,6-triacetate.

Example 13

The hydrolysis of an equivalent quantity of cholestane-3β,5α,6β-triol 3,5,6-triacetate according to the processes described in Example 4 results in cholestane-3β,5α,6β-triol 5-acetate, melting at 169–173°.

Example 14

When an equivalent quantity of cholestane-3β,5α,6β-triol 5-acetate is acetylated by the procedure described in Example 5, there is obtained cholestane-3β,5α,6β-triol 3,5-diacetate, which melts at 170–173°.

Example 15

The substitution of an equivalent quantity of cholestane-3β,5α,6β-triol 3,5-diacetate in the procedure of Example 6 results in 6β,19-epoxycholestane-3β,5α-diol 3,5-diacetate.

Example 16

By substituting an equivalent quantity of 6β,19-epoxycholestane-3β,5α-diol 3,5-diacetate and otherwise proceeding according to the processes described in Example 7, there is obtained 6β,19-epoxycholestane-3β,5α-diol 5-acetate, melting at 165–168°.

Example 17

When an equivalent quantity of 6β,19-epoxycholestane-3β,5α-diol 5-acetate is oxidized by the procedure described in Example 8, there is obtained 5α-acetoxy-6β,19-epoxycholestan-3-one, melting at 153–172°.

Example 18

The substitution of an equivalent quantity of 5α-acetoxy-6β,19-epoxycholestan-3-one in the procedure of Example 9 results in 19-hydroxycholest-4-en-3-one, melting at 148–150°.

Example 19

When an equivalent quantity of cholest-5-en-3β-ol 3-propionate or 24β-ethylcholest-5-en-3β-ol 3-propionate is subjected to the successive procedures of Examples 1–9, there are obtained, respectively, 19-hydroxycholest-4-en-3-one, identical with the product of Example 18, and 24β-ethyl-19-hydroxycholest-4-en-3-one, identical with the product of Example 9.

What is claimed is:
1. The process which comprises contacting a compound of the formula

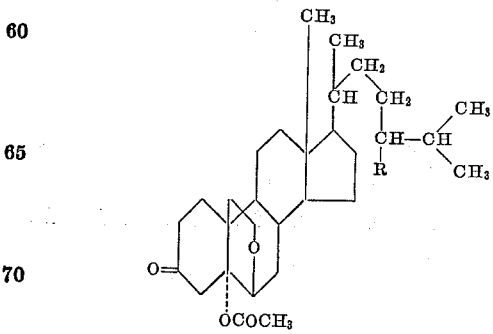

wherein R is selected from the group consisting of hydrogen and ethyl, with zinc in the presence of a Lewis acid to afford a compound of the formula 3,356,676

7

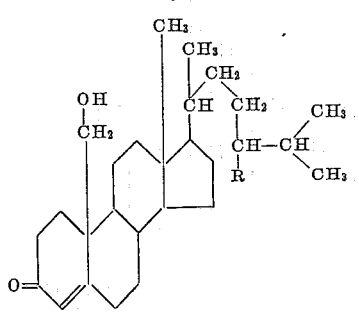

wherein R is selected from the group consisting of hydrogen and ethyl.

2. The process which comprises contacting a compound of the formula

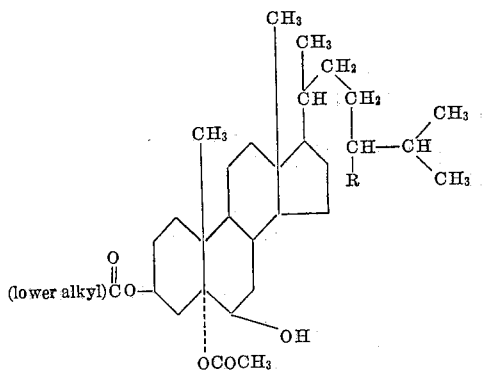

wherein R is selected from the group consisting of hydrogen and ethyl, with lead tetraacetate to afford a compound of the formula

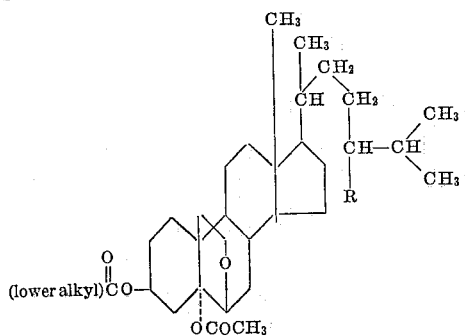

wherein R is selected from the group consisting of hydrogen and ethyl, selectively hydrolyzing the latter substance to afford a compound of the formula

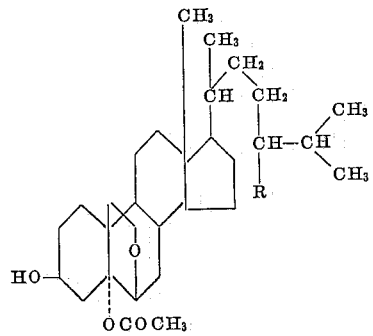

oxidizing that compound to produce a compound of the formula

8

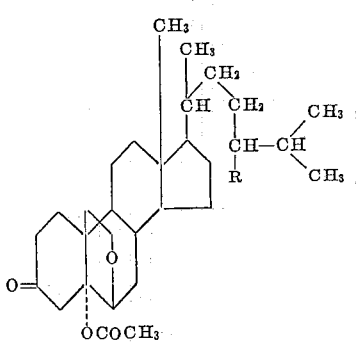

and contacting the latter substance with zinc in the presence of a Lewis acid, thus producing a compound of the formula

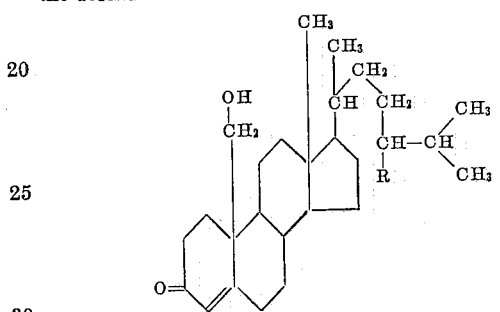

wherein R is as hereinbefore defined.

3. A compound of the formula

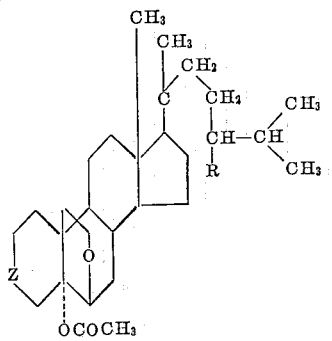

wherein Z is a member of the class of radicals consisting of carbonyl, β-hydroxymethylene and β-(lower alkanoyl)-oxymethylene and R is selected from the group consisting of hydrogen and ethyl.

4. 6β,19-epoxy-24β-ethylcholestane-3β,5α-diol 3,5-diacetate.

5. 6β,19-epoxy-24β-ethylcholestane-3β,5α-diol 5-acetate.

6. 5α-acetoxy-6β,19-epoxy-24β-ethylcholestan-3-one.

7. 6β,19-epoxycholestane-3β,5α-diol 3,5-diacetate.

8. 6β,19-epoxycholestane-3β,5α-diol 5-acetate.

9. 5α-acetoxy-6β,19-epoxycholestan-3-one.

References Cited
UNITED STATES PATENTS

| | | | |
|---|---|---|---|
| 3,169,958 | 2/1965 | Wettstein et al. | 260—239.55 |
| 3,211,726 | 10/1965 | Wettstein et al. | 260—239.55 |
| 3,290,296 | 12/1966 | Barton | 260—239.55 |

LEWIS GOTTS, *Primary Examiner.*

J. R. BROWN, *Assistant Examiner.*